(12) United States Patent
Tng

(10) Patent No.: US 8,924,490 B2
(45) Date of Patent: Dec. 30, 2014

(54) SERVICE BASED EVENT PLANNING

(75) Inventor: Chee Wee Tng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 221 days.

(21) Appl. No.: 13/174,201

(22) Filed: Jun. 30, 2011

(65) Prior Publication Data
US 2013/0007145 A1  Jan. 3, 2013

(51) Int. Cl.
*G06F 15/16* (2006.01)
*G06Q 10/10* (2012.01)
*G06Q 10/06* (2012.01)

(52) U.S. Cl.
CPC ............ *G06Q 10/063* (2013.01); *G06Q 10/107* (2013.01); *G06Q 10/10* (2013.01)
USPC .......................................... 709/206; 709/204

(58) Field of Classification Search
USPC ................................................ 709/204, 206
See application file for complete search history.

(56) References Cited

U.S. PATENT DOCUMENTS

| | | | |
|---|---|---|---|
| 5,634,016 A * | 5/1997 | Steadham et al. ............ | 715/753 |
| 7,679,518 B1 * | 3/2010 | Pabla et al. ................. | 340/573.1 |
| 8,244,561 B2 * | 8/2012 | Halavais et al. ................... | 705/5 |
| 8,775,223 B2 * | 7/2014 | Halavais et al. ................... | 705/5 |
| 2002/0075293 A1 * | 6/2002 | Charisius et al. ............. | 345/704 |
| 2002/0188490 A1 | 12/2002 | Kruse | |
| 2003/0125998 A1 * | 7/2003 | McKenney et al. ................ | 705/7 |
| 2007/0011232 A1 * | 1/2007 | Manion et al. ................. | 709/204 |
| 2007/0143412 A1 * | 6/2007 | Qi ................................... | 709/206 |
| 2007/0220472 A1 * | 9/2007 | Wei et al. .......................... | 716/11 |
| 2009/0254615 A1 * | 10/2009 | Baliga et al. ................... | 709/204 |
| 2010/0037151 A1 * | 2/2010 | Ackerman et al. ............ | 715/753 |
| 2010/0091320 A1 * | 4/2010 | Sojian .......................... | 358/1.15 |
| 2011/0113018 A1 * | 5/2011 | Hamilton et al. ............. | 707/692 |
| 2011/0238768 A1 * | 9/2011 | Habets et al. .................. | 709/206 |
| 2011/0271210 A1 * | 11/2011 | Jones et al. .................... | 715/753 |
| 2012/0304088 A1 * | 11/2012 | Kho et al. ...................... | 715/764 |
| 2012/0311447 A1 * | 12/2012 | Chisa et al. .................... | 715/719 |
| 2013/0006695 A1 * | 1/2013 | Haustein et al. ............. | 705/7.26 |
| 2013/0024452 A1 * | 1/2013 | Defusco et al. ............... | 707/737 |
| 2013/0219298 A9 * | 8/2013 | Whalin et al. ................ | 715/753 |

OTHER PUBLICATIONS

The Mind Mapping Software weblog; Published Date: Apr. 12, 2007; pp. 1-2; http://mindmapping.typepad.com/the_mind_mapping_software/2007/04/managing_meetin.html.
SharePoint 2007 Visio Stencil; Published Date: Feb. 1, 2008; pp. 1-2; http://sharepointsherpa.com/2008/02/01/sharepoint-2007-visio-stencil/.

(Continued)

*Primary Examiner* — Tammy Nguyen
*Assistant Examiner* — Jonathan Bui
(74) *Attorney, Agent, or Firm* — Steve Crocker; Jim Ross; Micky Minhas

(57) ABSTRACT

Services are queried for resources to be used at an event. For example, service based event planning may be used in conjunction with directory services, social networking services, custom databases, web services, email servers and address book services. Service based event planning may apply constraints to the resources obtained over services. The service based event planning may also be used in conjunction with email or other messaging services to share representations of events with attendees or other interested parties. Both recipients and senders of the event may be able to dynamically modify event details in event representations.

20 Claims, 6 Drawing Sheets

(56) References Cited

OTHER PUBLICATIONS

Mind map layer added to layer properties of a drawing in Visio 2003; Published Date: Jan. 11, 2006; pp. 1-2; http://support.microsoft.com/kb/829774#appliesto.

Outlook 2010 Meeting Workspace Options; Published Date: Apr. 26, 2010; pp. 1-2; https://www.johnchapman.name/outlook-2010-meeting-workspace-options/.

Organize Meetings; Retrieved Date: Oct. 18, 2010; pp. 1-9; http://www.slideshare.net/duboiscdc/organize-meetings-presentation-698157.

View meeting room capacity with the Conference room shape in Visio; Retrieved Date: Oct. 18, 2010; pp. 1-3; http://office.microsoft.com/en-gb/visio-help/view-meeting-room-capacity-with-the-conference-room-shape-in-visio-HA001100391.aspx.

Meeting Room Manager; Retrieved Date: Oct. 18, 2010; pp. 1-2; http://www.netsimplicity.com/mrm/schedulingsoftwareD.asp?mtcPromotion=ISM%3EIDAG36-S-AllDay&__kk=f6368533-dc02-49f4-9788-485d07e9b418&__kt=5609472298&gclid=COX6ufP__26QCFU1h4wod4WgfJQ.

Visio Stencils for SharePoint 2010; Published Date: Apr. 26, 2010; pp. 1-3; http://www.johnchapman.name/visio-stencils-for-sharepoint-2010/.

\* cited by examiner

SERVICE BASED EVENT PLANNING

BACKGROUND

To be successful, events need to be planned and representations of the events may be shared. When organizing an event, various resources, including equipment, rooms, layout, and other items may need to be gathered and the details of these items coordinated along with invitees in order to make the event successful. The resources for an event may be gathered from disparate source services, such as, for example, from social networking sites, directory services, internet and/or intranet web resources, and other sources. Each resource may have timing constraints on availability. After the event is planned, the details of the event may need to be distributed and shared to attendees or other participants (such as people helping to setup the event) in order to make the event successful. Representations of events may be generated, and when the representations are complete, descriptions and illustrations of events may be sent to attendees or other interested parties.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments herein provide event planning based on receiving information items from services. In one embodiment, events may be planned by selecting attendees, furniture, layout of a room, computer equipment as well as time and calendar information about the event. The information may be modeled using a graphical user interface to generate a representation of an event. The representation of the event may include graphics and/or text. The representation of the event may be sent to attendees.

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

DETAILED DESCRIPTION

The detailed description provided below in connection with the appended drawings is intended as a description of present examples and is not intended to represent the only forms in which the present examples may be constructed or utilized. The description sets forth functions of the examples and sequence of steps for constructing and operating the examples. However, the same or equivalent functions and sequences may be accomplished by different examples.

Figure 1:
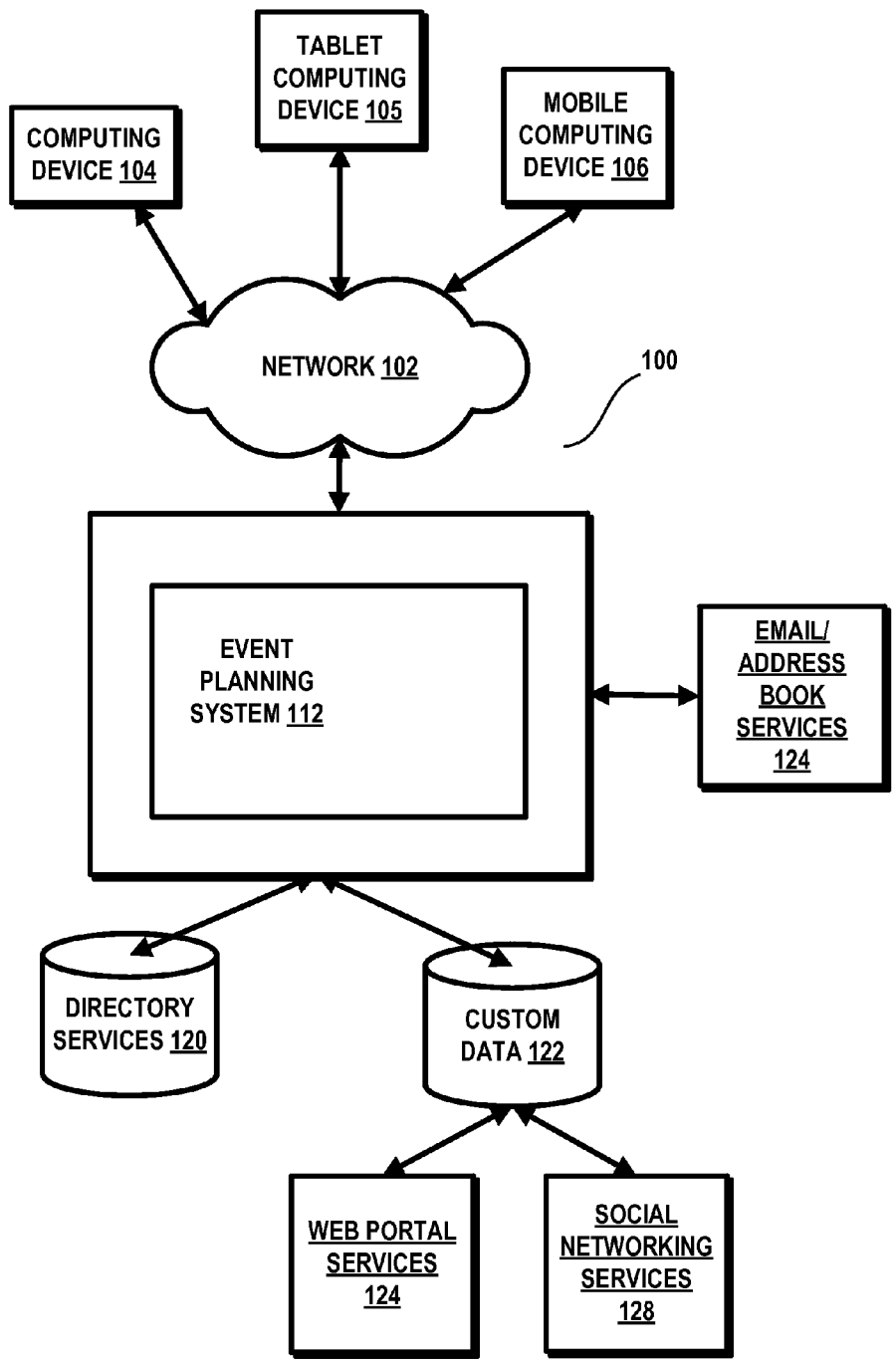
FIG. 1 is a block diagram of an example operating environment for implementing embodiments of the invention.

FIG. 1 shows an embodiment of an operating environment 100 for implementing embodiments of the invention. FIG. 1 and the following discussion are intended to provide a brief, general description of a suitable computing environment to implement embodiments of the invention. The operating environment 100 is only one example of a suitable operating environment. FIG. 1 illustrates an event planning system on one or more servers, but it is to be appreciated that the event planning system may also just execute on one or more client computing systems, or still further, it may execute on a combination of client and server computing systems.

Referring to FIG. 1, operating environment 100 includes a network 102. Network 102 may be the internet, or network 102 may comprise an intranet, and the like. An event planning system 112 may communicate with computing devices 104, 105, and 106 over network 102. An example computing device is described below in connection with FIG. 2. Computing device 104 may include any type of personal computer, such as a desktop computer, mainframe computer, and the like. Tablet computing device 105 includes slate devices that may be personally carried and used for browsing online services. Mobile computing device 106 may include smart phones, or other mobile computers. Each computing device 104-106 may be used to view representations of events.

Event planning system 112 is a server or servers configured to provide event planning services online. Event planning system 112 may send binary data, XML data, HTML, or other markup language to the client devices 104-106 via network 102. Event planning system 112 is configured to communicate with an email services and/or address book services 124. As such, event planning system 112 may access availability information about attendees to the events as well as people and resources available for events. Event planning system 112 may also be in communication with a custom data 122 and directory services 120. The directory services 120 may provide further information about resources such as, for example, meeting rooms, employees, equipment, etc. Still further, custom data 122 may be populated from data on the web such as from web sites or web portals 124 or from social networking sites 128.

Event planning system 112 may be in direct communication with web portal services 124 or social networking sites 128 or may use custom data 122 to hold or cache information. Event planning system 112 may store and/or retrieve information about events on a file on a server, with email services, or may store and/or retrieve data in a database. For example, event planning system 112 may store and/or retrieve event details in custom data 122. Custom data 122 may be implemented with one or more files, database, or other storage mechanism.

Figure 2:
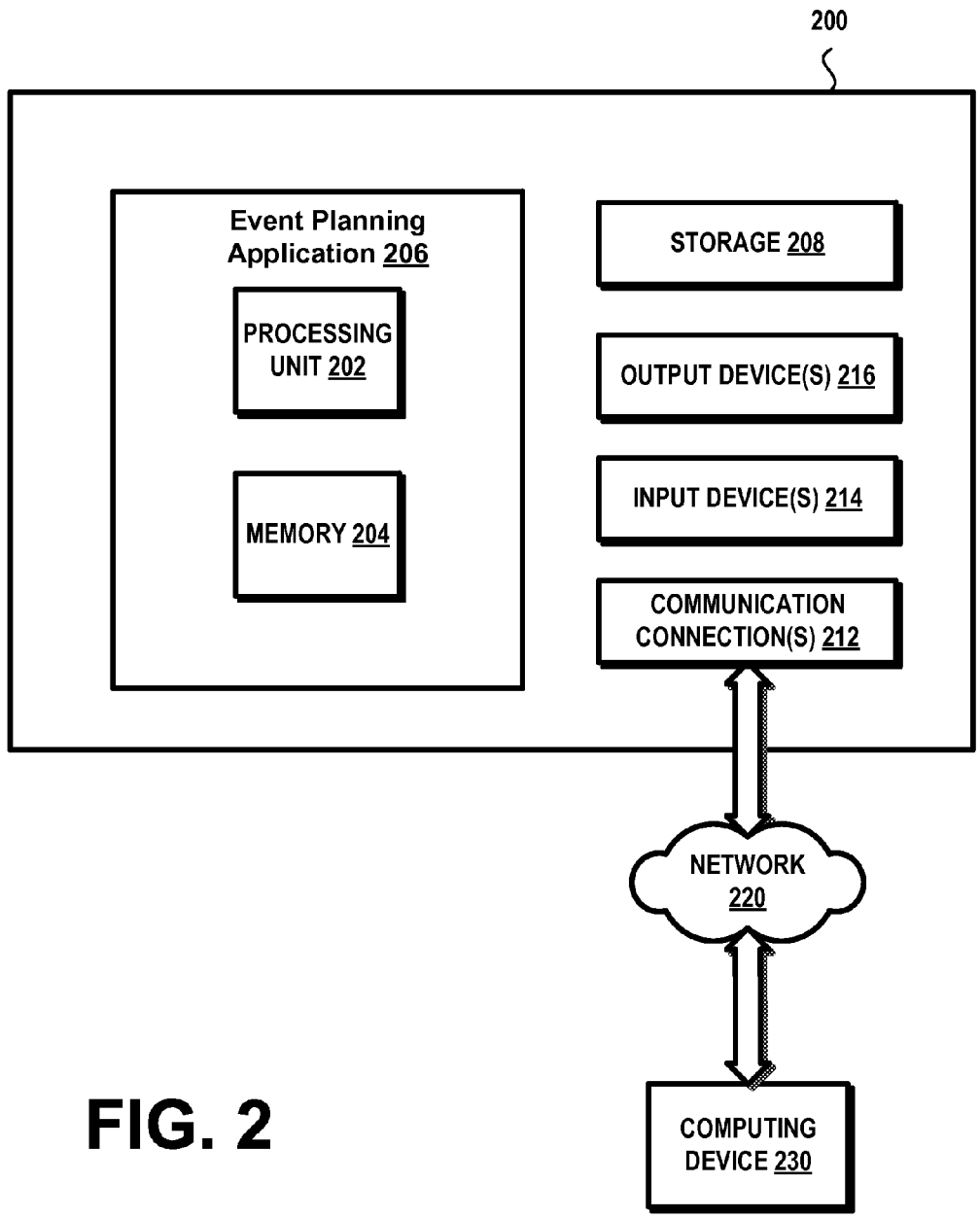
FIG. 2 is a block diagram of an example computing device for implementing embodiments of the invention.

FIG. 2 shows an embodiment of a computing device 200 for implementing one or more embodiments of the invention. FIG. 2 illustrates a computing device 200 that may display event representations on the computing device 200 itself or send data representations of events to another computing device. In one embodiment, computing device 200 may be used as system 112 of FIG. 1. In another embodiment, computing device 200 may be used as a client system that generates representations of events using resources and/or constraints gathered from services. In its most basic configuration, computing device 200 typically includes at least one processing unit 202 and memory 204. Depending on the exact configuration and type of computing device, memory 204 may be volatile (such as RAM), non-volatile (such as ROM, flash memory, etc.) or some combination of the two. Event planning application 206 may store data and instructions in memory 204 and use processing unit 202 to execute computer instructions.

Additionally, device 200 may also have additional features and/or functionality. For example, device 200 may also include additional storage (e.g., removable and/or non-removable) including, but not limited to, magnetic or optical disks or tape. Such additional storage is illustrated in FIG. 2 by storage 208. In one embodiment, computer readable instructions to implement embodiments of the invention may be stored in storage 208. Storage 208 may also store other computer readable instructions to implement an operating system, an application program (such as an event planning application), and the like.

Embodiments of the invention will be described in the general context of "computer readable instructions" being executed by one or more computing devices. Computer readable instructions may be distributed via computer readable media (discussed below). Computer readable instructions may be implemented as program modules, such as functions, objects, application programming interfaces (APIs), data structures, and the like, that perform particular tasks or implement particular abstract data types. Typically, the functionality of the computer readable instructions may be combined or distributed as desired in various environments.

The term "computer readable media" as used herein includes computer storage media. "Computer readable storage media" includes volatile and nonvolatile, removable and non-removable media implemented in any method or technology for storage of information such as computer readable instructions, data structures, program modules, or other data. Memory 204 and storage 208 are examples of computer storage media. Computer readable storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices. "Computer readable storage media" does not consist of a "modulated data signal." Any such computer storage media may be part of device 200.

The term "computer readable media" may include communication media. Device 200 may also include communication connection(s) 212 that allow the device 200 to communicate with other devices, such as with other computing devices through network 220. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

Device 200 may also have input device(s) 214 such as keyboard, mouse, pen, voice input device, touch input device, gesture detection device, laser range finder, infra-red cameras, video input devices, and/or any other input device. Input device(s) 214 may include input received from gestures or by touching a screen. For example, input device(s) 214 may detect swiping the screen with a finger, or one or more gestures performed in front of sensors (e.g. MICROSOFT KINECT). Output device(s) 216 includes items such as one or more displays, speakers, printers.

Those skilled in the art will realize that computer readable instructions may be stored on storage devices that are distributed across a network. For example, a computing device 230 accessible via network 220 may store computer readable instructions to implement one or more embodiments of the invention. Computing device 200 may access computing device 230 and download a part or all of the computer readable instructions for execution. Alternatively, computing device 200 may download pieces of the computer readable instructions, as needed, or some instructions may be executed at computing device 200 and some at computing device 230. Display representations may be sent from computing device 200 to computing device 230 or vice versa. Those skilled in the art will also realize that all or a portion of the computer readable instructions may be carried out by a dedicated circuit, such as a Digital Signal Processor (DSP), programmable logic array, and the like.

Business Event Planning

Embodiments of the invention provide a mechanism for planning and sharing event representations using services. Event representations may include diagrams/layouts of events as well as descriptions of details about the events.

Figure 3:
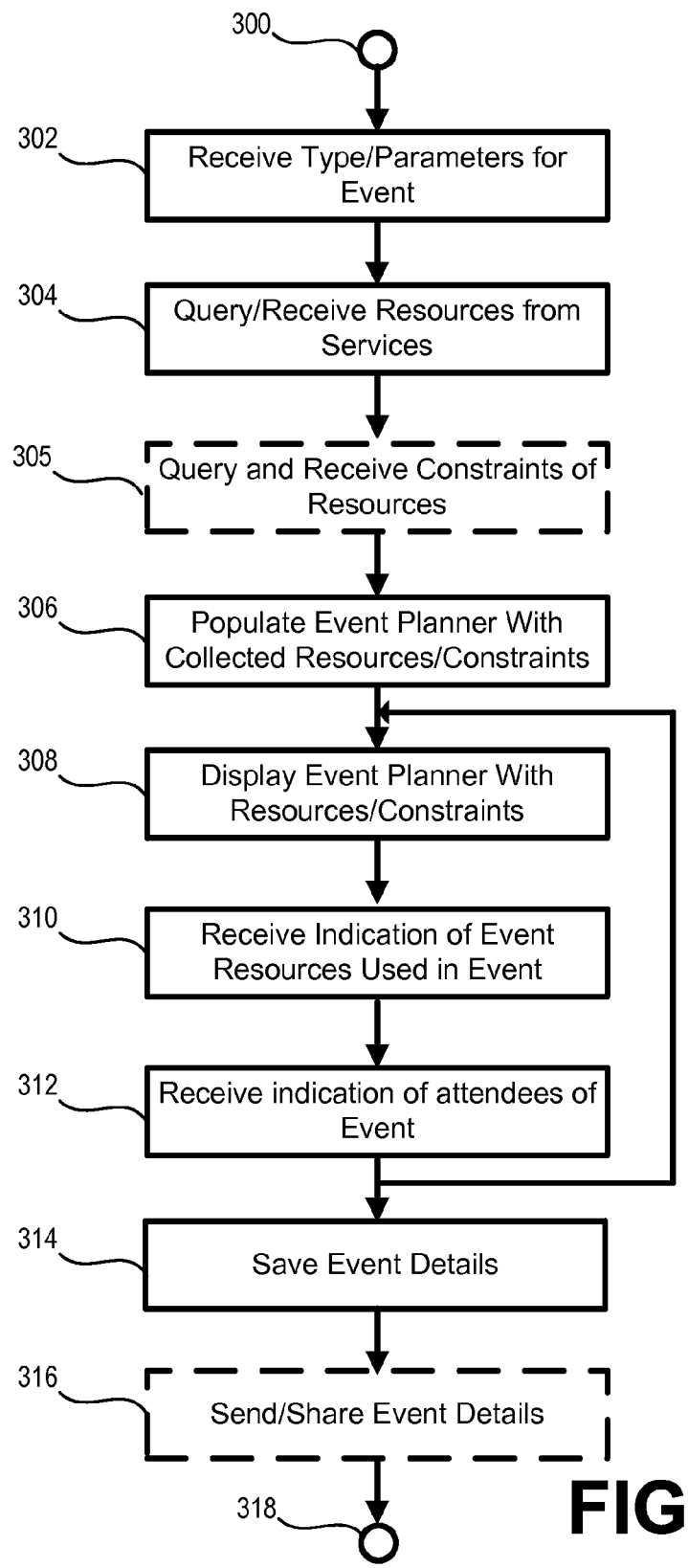
FIG. 3 is a flow chart illustrating a computer-implemented method for planning an event using service based resources and then distributing details about the event.

FIG. 3 illustrates a computer-implemented method for planning an event using service based resources and then distributing details. At initial stage 300, an event to be planned is received. For example, an event may be received from automation or by a user.

At step 302, a type of event and/or other parameters are selected. For example, types of event may include a corporate meeting, a social event such as a speech or a wedding. Other parameters may be received that constrain the event. For example, in step 302, a date and time for the event may be selected.

At step 304, based on the type of event, the computer-implemented method may query disparate data sources for resources that are available for the type of event. At step 305, constraints associated with the resources may be queried and received. For example, the resources may be available based on timing and schedule for the event. As one example, a meeting room may only be available during a certain date. At step 306, the event planner user interface may be populated based on resources suitable for the type of event and suitable for the scheduling of the event. At step 308, a view may be displayed with the resources and constraints available.

Still referring to FIG. 3, at step 310, indications of resources used for the event are received. For example, a user may provide indications by dragging and dropping resources on to a depiction of the venue for the event. At step 312, an indication of one or more attendees to the event, or other participants, may be received. A user may continuously modify resources and/or attendees in step 310 and 312, and the event planner application may update the display representation of the event based on the received modifications in step 308. As such, steps 308, 310 and 312 are illustrated as being part of a loop that may be executed any number of times. It is to be appreciated that other steps may also be performed repeatedly. As one example, there could be multiple queries for resources/constraints.

At step 314, the event details, including resources, timing, and the like may be persisted to a file, a database, or other storage. At step 316, the details of the event, including any depiction of the event may be forwarded to any one of the attendees.

The computer-implemented method may be operated in any software and/or hardware. As a first example, the computer-implemented method may be an option in a drawing program that interoperates with services, including directory services, custom databases, as well as calendar software such as email servers or address book servers. As one example, a drawing program could be MICROSOFT VISIO. In another embodiment, the computer-implemented method may be operated in calendar or email software application that allows for planning events. As an example, a calendar software application could be MICROSOFT OUTLOOK.

By way of further illustration of the computer-implemented method depicted by FIG. 3, an example usage may be described. The event planner system may receive an indication of a type of event in step 302. For example, a business event type may be selected. At step 304, in response to the type of the event, the event planner may determine a first service to query for a first resource at step 304. For example, a directory service may be queried for possible meeting room resources. At step 306, event planner may also query and receive one or more constraints associated the resource. At step 306 the event planner is populated with received resources and constraints, and at step 308 a representation of the event is displayed. At step 310, an indication that a first instance of a first resource is present at the event may be received. For example, this may occur if a user drags an instance of the resource to the display representation of the event. At step 314 the first instance of the first resource may be displayed at a location in association with the event.

As described previously, the computer-implemented method may use any combination of services to populate resources and/or constraints of the resources available for an event. For example the first service in the example may be a directory service, a web service, a social networking service or an address book listing attendees.

After the event has been planned, a user may save the event in step 314. In addition, a user may send a representation of the event via email to one or more participants. Participants may include attendees or those helping with logistics of the event. A feature of the event planner may include the ability to modify details of the event in an email program. Depending on permissions, either a sender or receiver of an email may modify details about an event. For example, a user may modify an attendee in the event in email, before sending the event representation out. Under those circumstances, the event planner data may be saved or updated when a resource instance is modified in the event planning. Details of the event may be saved in a database or file.

As previously described, the event planner may receive one or more indications of constraints associated with the resources of an event. For example, constraints may be received over XML web services, via text, via binary data exchange, or other network protocols. The constraints may limit the use of resources in event planning. For example, constraints may include availability information of resources, such as dates/times when an attendee may be able to attend an event, or as another example, the locations in which an attendee can attend during certain timeframes. As yet another example, services may indicate a limited quantity of a resource. For example, a directory service may indicate that only one resource of a certain type is available. The event planner method may include modifying details of the event based on constraints associated with the event, such as by modifying the date of the event. The event planner method may also include modifying resources, such as facilities of the event.

The details of the event may be displayed on the local computer or displayed remotely on a client device. If displayed remotely, a representation of the event may be sent using HTML, XML, other markup languages, or binary data.

Figure 4:
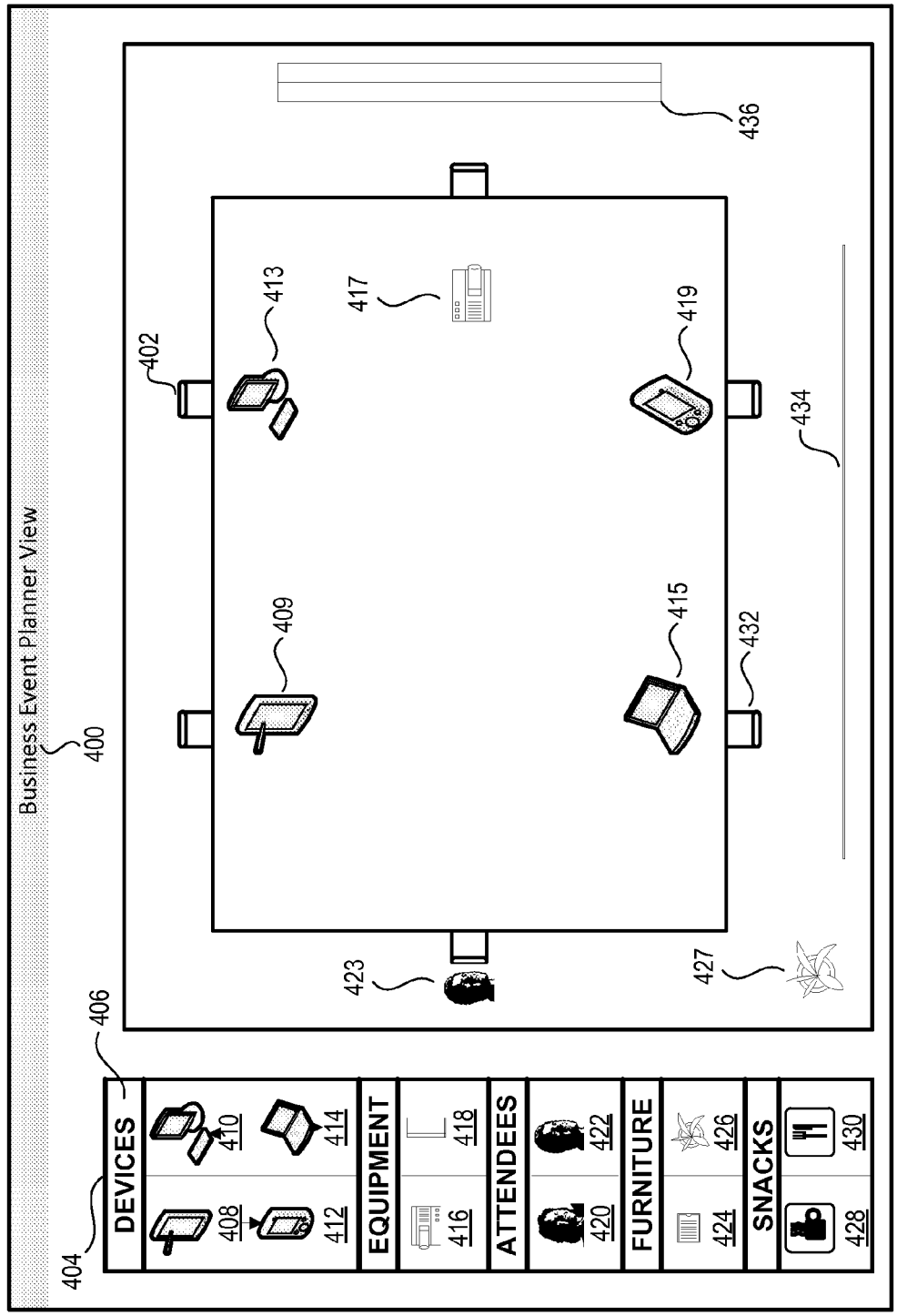
FIG. 4 illustrates a graphical user interface for planning an event in a meeting room using resources from services.

FIG. 4 illustrates a graphical user interface for planning a meeting event. The meeting may be a physical meeting between people in a room or, in another embodiment, an online meeting between avatars representing people. User interface 400 illustrates a business event planner user interface. Toolbox 404 may comprise various resources that may be employed in the planning user interface 400. For example, category 406 includes devices that may be used in the meeting event. As an exemplary device, smart phone 408, personal computer 410, tablet computer 412 and laptop computer 414 may be used by any attendees. Other equipment may include items such as a projector 416 and projection screen 418. In addition, toolbox 404 may comprise attendees that attend the event. For example, possible attendees 420 and 422 are shown. As another example category, furniture in the meeting event may be depicted. For example, chair 424 and plant 426 are depicted. Categories may also include a snacks section that includes beverage 428 and cutlery 430. The items within the toolbox may be dragged from the toolbox 404 and dropped onto the user interface 400. The location of the drop point may indicate where in the event the organizer wishes the item to be located at the time of the event. In an alternative, items in toolbox 404 may be double-clicked, and an instance of the resource may appear in the user interface 400. A user may then drag the resource to the desired final location.

The resources to be used in the user interface 400 may be populated from a local file of resources, or as described previously, the resources may be dynamically populated from various data sources and network services. For example, the category 406 may be dynamically populated from a directory service that may maintain devices available within an enterprise. Similarly, equipment may be listed from a directory service, a custom database or other source. Attendees or other participants may be retrieved from an email address book service, an active directory, a database, a social networking service, or other network service. Furniture, snacks or other categories of resource may be retrieved from a custom database, directory service or other data source.

Still referring to FIG. 4, business event planner user interface 400 shows instances of resources on the event planning view representation. More than one instance of a resource may be present on a view. For example, FIG. 4 illustrates a first instance of a chair 402 and a second instance of a chair 432. The planned position of a person 423 is shown. Instances of a tablet personal computer 409, personal computer 413, a laptop 415 and mobile device 419 are depicted. Instances of resources on an event representation may be moved around the user interface 400 to indicate the desired position of the resource during an event. As one example, a user may move resources around a screen using a mouse, a touch from a finger or stylus, or other pointing device. In addition, instances of resources may be copied and pasted in the view indicating that another instance of the resource is present.

The instances of resources may be constrained via services. For example, a directory service may restrict how many instances of a person can appear in a view. As an example, a constraint may exist such that only one instance of a person may be placed on the view. The constraints may be customized locally on the event planning view computer, or they may be downloaded from any one of the network services in conjunction with the resources or they may be downloaded as separate items to the resources.

Figure 5:
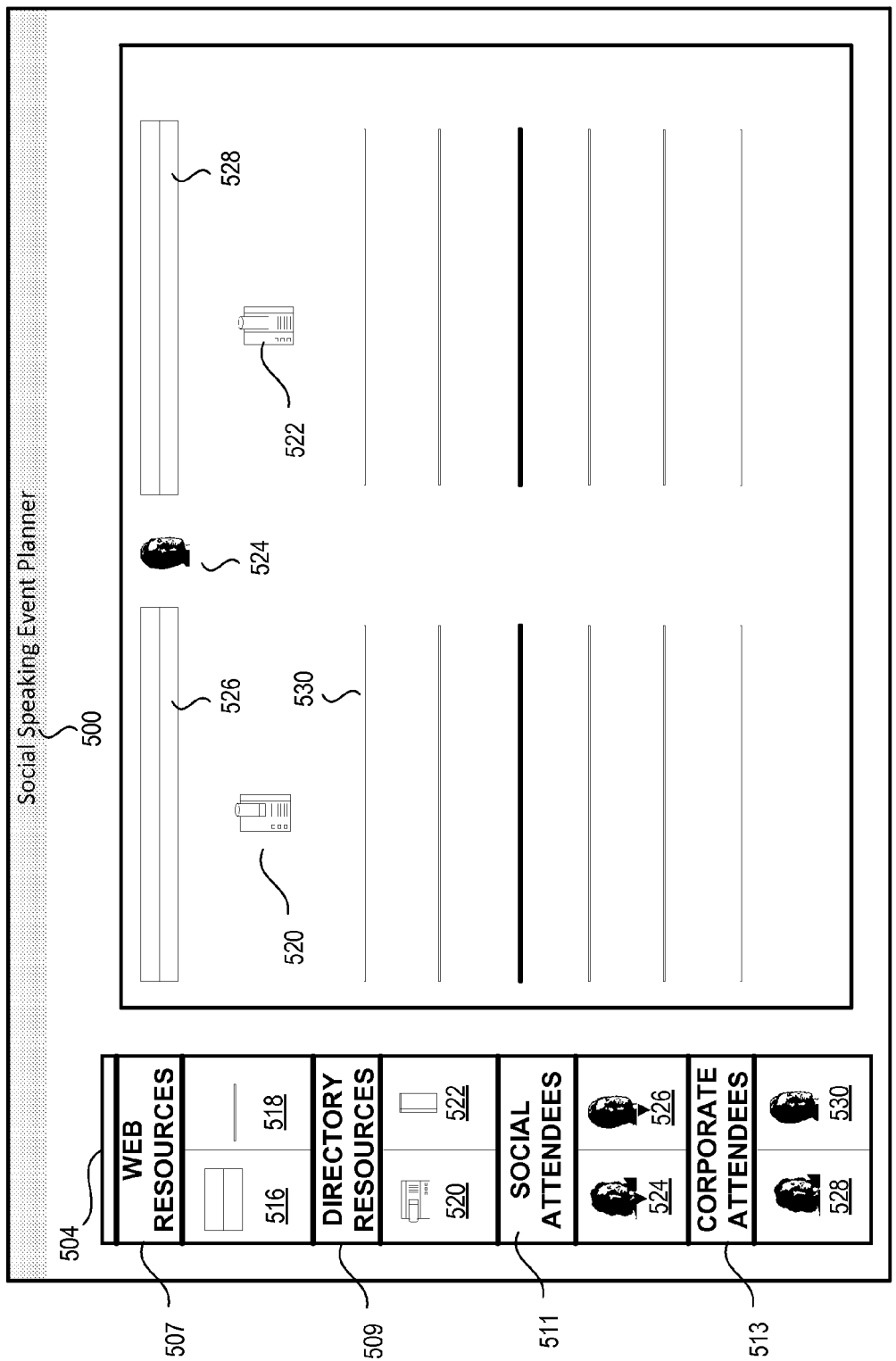
FIG. 5 illustrates a graphical user interface for planning a social event using online services.

FIG. 5 illustrates a graphical user interface for planning a social event using online services. In the example of FIG. 5, a speaking event is planned. Social events may include such event types as speaking events, weddings, trips to a restaurant, vacations, a church or social club event, a picnic, and the like. Toolbox 504 illustrates disparate types of resources gathered from network services such as resources gathered from the web, such as particular kinds of screens 516 and rows of seating 518. Any network provider may provide resources via XML web services, web pages, or other online sharing mechanisms. Category 509 illustrates resources obtained from a public directory service. In the example of FIG. 5, projector resource 520 and computer 522 are displayed. Social attendees 524 and 526 illustrate possible attendees gathered from a social networking site.

The computer-implemented event planning application may employ logic to parse details about people from the format shared out by the social networking site or the social networking site may adhere to a standard for sharing out resources. FIG. 5 also illustrates attendees 528 and 530 in the toolbox. Corporate attendees 528 and 530 may be located from a directory service (e.g. MICROSOFT ACTIVE DIRECTORY) or from a corporate enterprise address book associated with an email server (e.g. MICROSOFT EXCHANGE SERVER) or other service.

In FIG. 5, instances of projector resource 520 have been placed on the event planner view as instances 520 and 522. Instances of seating 518 are shown as 530. Instance 524 may be an instance of corporate attendee 530. Instances 526 and 528 illustrate instances of resource screen 516.

Figure 6:
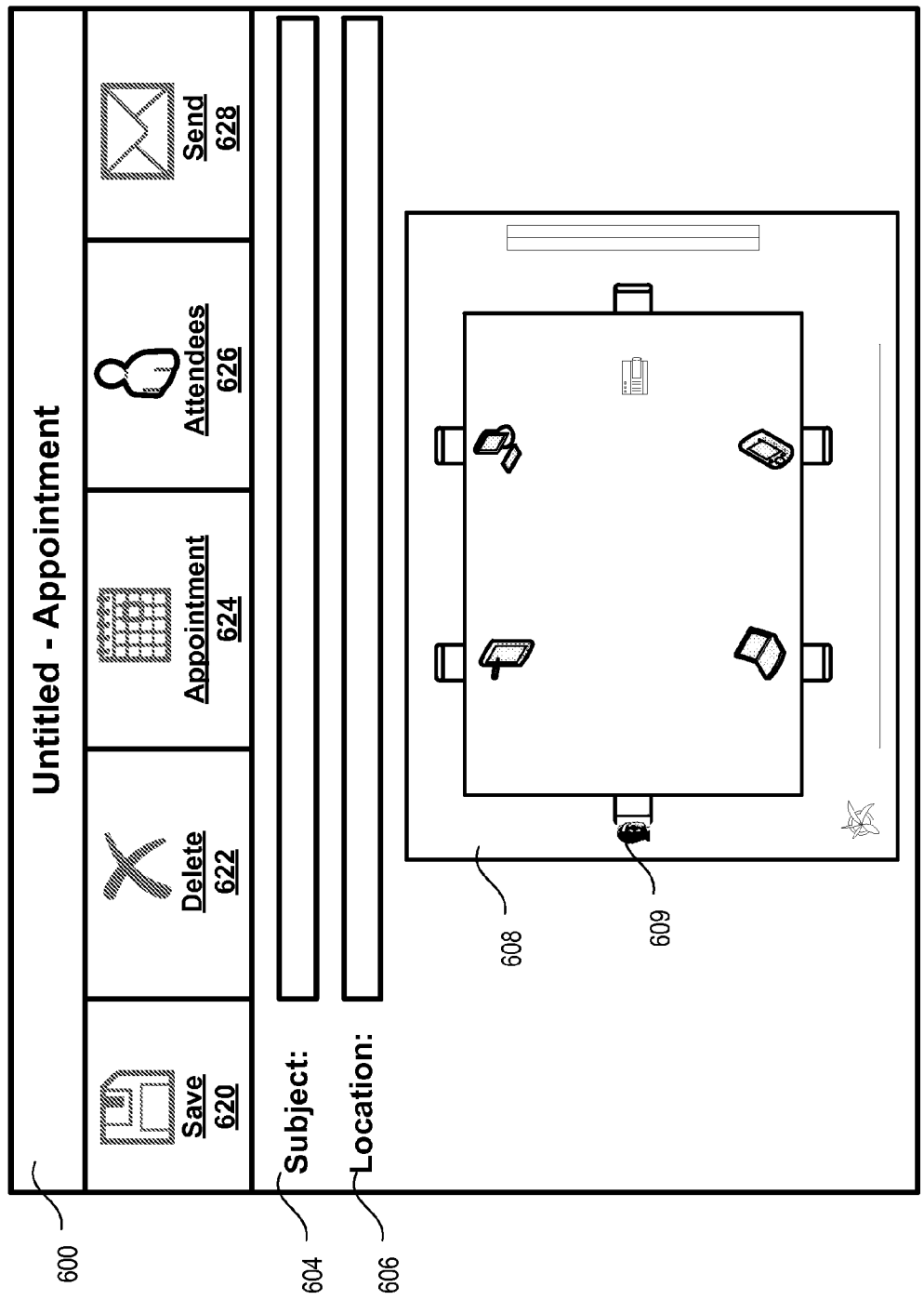
FIG. 6 illustrates a graphical user interface for sharing details of an event with attendees and/or other participants.

FIG. 6 illustrates distributing or sharing a view of the event with other participants or attendees. As an example, the event representation may be sent via a mail computer program, shared out on the web, placed on a social networking site, or otherwise shared to a community. User interface 600 includes a user interface for the appointment regarding the event. User interface 600 may provide save functionality 620 for saving the event as well as timing of the event. Details may be saved to a database, a file, or other persistence form.

Still referring to FIG. 6, Delete functionality 622 may allow for deleting a planned event. Appointment 624 may allow for modification of the event timing details, including the day and time of the event. The event may be recurring, in which case appointment functionality 624 may allow for specification of recurrence details such as the recurring day of the week, the recurring date or other repeated schedule details. Attendees' functionality 626 may allow for the attendees or participants to receive the event details. Attendees' functionality 626 may automatically populate using attendees associated with the event. Modification of the list of attendees via attendee functionality 626 may modify the attendees depicted and included in the event view 608. Send functionality 628 may send the details of the event to a list of attendees or participants of the event.

FIG. 6 also illustrates a view 608 that was created for the event using service based functionality. A user may be able to modify instances of resources within the view. For example, a user may be able to double click an instance of an attendee 609 and modify the properties of the instance of the resource, such as the identity of the resource. The event planning application may share out, via the web, email, social networking sites or other sharing mechanisms, the event representation that includes the location of the attendees and resources associated with the event.

The event representation, or part of the event representation may be dynamic (allowing modification) or static (no modification possible). By being dynamic, a sender and/or recipient of the shared view of the event may be able to modify resources and/or attendees. The organizer or sender of the event representation may be able to set permissions that specify the level of modifications that are possible by each recipient. In addition, the sender or organizer may be able to set privacy levels associated with the event representation.

Various operations of embodiments of the present invention are described herein. In one embodiment, one or more of the operations described may constitute computer readable instructions stored on computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A computer-implemented method, comprising:
receiving an indication to plan an event for attendees to the event;
receiving an event type and parameters including a date and time for the event;
in response to the event type indicating a physical meeting between people, querying a first service for a meeting room that is available during the date and time for the event;
receiving, from the first service, information about resources that may be used by one or more attendees during the event;
displaying a graphical user interface including a diagram layout of the meeting room and a toolbox depicting instances of the resources;
receiving a selection of an instance of a first resource on the toolbox;
receiving an indication of a location of the instance of the first resource on the diagram layout of the meeting room, the location indicating an intended position for the first resource at the event;
displaying the instance of the first resource at the location within the diagram layout of the meeting room.

2. The computer-implemented method of claim 1, wherein the first service is a directory service.

3. The computer-implemented method of claim 1, further comprising:
accessing information related to the attendees from at least one of a directory service or a social networking service.

4. The computer-implemented method of claim 3, further comprising:
depicting instances of the attendees in the toolbox;
receiving an indication to drag and drop an instance of a first attendee from the toolbox on to the diagram layout of the meeting room, wherein the first resource is equipment to be physically located at the event for use by the first attendee during the event.

5. The computer-implemented method of claim 3, further comprising:
receiving an indication that a first attendee is present at the event.

6. The computer-implemented method of claim 4, further comprising:
sending, via email to the first attendee, the diagram layout of the meeting room, wherein the diagram layout of the meeting room shows the instance of the first resource and the instance of the first attendee.

7. The computer-implemented method of claim 6, further comprising:
receiving an indication of a modification of the diagram layout of the meeting room from the first attendee via email;
saving the modification of the diagram layout of the meeting room to a database.

8. A computer system comprising:
a processor for executing computer instructions, and
memory storing computer instructions configured to perform a method comprising:
receiving an indication to plan an event for attendees to the event;
receiving an event type and parameters including a date and time for the event;
in response to the event type indicating a physical meeting between people, querying a directory service for a meeting room that is available during the date and time for the event;
receiving from, the directory service, information about resources that may be used by one or more attendees during the event;
displaying a graphical user interface including a diagram layout of the meeting room and a toolbox depicting instances of the resources;
receiving a selection of an instance of a first resource on the toolbox;
receiving an indication of a location of the instance of the first resource on the diagram layout of the meeting room, the location indicating an intended position for the first resource at the event;
displaying the instance of the first resource at the location within the diagram layout of the meeting room.

9. The computer system of claim 8, wherein the memory further stores computer instructions configured to:
access information related to the attendees to the event from at least one of the directory service or a social networking service.

10. The computer system of claim 9, wherein the memory further stores computer instruction configured to:
depict instances of the attendees in the toolbox;
receive an indication to drag and drop an instance of a first attendee from the toolbox on to the diagram layout of the meeting room, wherein the first resource is equipment to be physically located at the event for use by the first attendee during the event.

11. The computer system of claim 9, wherein the memory further stores computer instructions configured to:
receive an indication that first attendee is present at the event.

12. The computer system of claim 10, wherein the memory further stores computer instructions configured to:
send, via email to the first attendee, the diagram layout of the meeting room, wherein the diagram layout of the meeting room shows the instance of the first resource and the instance of the first attendee; and
receive an indication of a modification of the diagram layout of the meeting room from the first attendee.

13. A computer-readable storage device storing computer-executable instructions that, when executed by a computer, cause the computer to perform a method comprising:
receiving an indication to plan an event for attendees to the event;
receiving an event type and parameters including a date and time for the event;
in response to the event type indicating a physical meeting between people, querying a first service for a meeting room that is available during the date and time for the event;
receiving, from the first service, information about resources that may be used by one or more attendees during the event;
displaying a graphical user interface including a diagram layout of the meeting room and a toolbox depicting instances of the resources;
receiving a selection of an instance of a first resource on the toolbox;
receiving an indication of a location of the instance of the first resource on the diagram layout of the meeting room, the location indicating an intended position for the first resource at the event;
displaying the instance of the first resource at the location within the diagram layout of the meeting room.

14. The computer-readable storage device of claim 13, further storing computer-executable instructions configured to:
access information related to the attendees from at least one of a directory service or a social networking service.

15. The computer-readable storage device of claim 14, further storing computer-executable instructions configured to:
display an indication that a first attendee is present at the event.

16. The computer-readable storage device of claim 14, further storing computer-executable instructions configured to:
depict instances of the attendees in the toolbox;
receive an indication to drag and drop an instance of a first attendee from the toolbox on to the diagram layout of the meeting room, wherein the first resource is equipment to be physically located at the event for use by the first attendee during the event.

17. The computer-readable storage device of claim 13, further storing computer-executable instructions configured to:
receive a constraint associated with an attendee, wherein the constraint includes availability information related to the attendee; and
modify details of the event based on the constraint associated with the attendee.

18. The computer-readable storage device of claim 17, wherein the details of the event that are modified include the date for the event.

19. The computer-readable storage device of claim 17, wherein the details of the event that are modified include meeting room facilities at the event.

20. The computer-readable storage device of claim 13, wherein the event includes any one of a business event or a social event.

* * * * *